United States Patent [19]
Kashimoto

[11] Patent Number: 5,844,645
[45] Date of Patent: Dec. 1, 1998

[54] COLOR LIQUID-CRYSTAL DISPLAY DEVICE

[75] Inventor: Koji Kashimoto, Tokyo, Japan

[73] Assignee: NEC Corporation, Tokyo, Japan

[21] Appl. No.: 880,157

[22] Filed: Jun. 20, 1997

[30] Foreign Application Priority Data

Jun. 20, 1996 [JP] Japan ................... 8-159296

[51] Int. Cl.⁶ ................................. G02F 1/1333
[52] U.S. Cl. .................. 349/106; 349/110; 349/122
[58] Field of Search .................. 349/106, 110, 349/111, 107, 122; 359/891; 345/88; 430/7

[56] References Cited

U.S. PATENT DOCUMENTS 5,617,230  4/1997  Ohgawara et al. ............ 349/110
5,680,187 10/1997  Nagayama et al. ............ 349/110
5,739,888  4/1998  Ogura et al. .................. 349/110

FOREIGN PATENT DOCUMENTS 62-299889 12/1987 Japan .
63-287821 11/1988 Japan .
1-269917  10/1989 Japan .
3-2826     1/1991 Japan .
3-125120   5/1991 Japan .
4-301624  10/1992 Japan .
4-309925  11/1992 Japan .
5-134106   5/1993 Japan .

Primary Examiner—William L. Sikes
Assistant Examiner—Tai V. Duong
Attorney, Agent, or Firm—Young & Thompson

[57] ABSTRACT

A color LCD device is capable of preventing the leakage of an internal light irradiated from a back light without the problems relating to the fabrication cost and the cell-gap control. This device has a black matrix located and a light-shielding layer formed on a back surface of a color-filter substrate. The black matrix is located in a display area of the substrate. The light-shielding layer is located in a light-shielding area of the substrate. The black matrix is formed by a first part of a black layer located in the display area. The light-shielding layer is formed by a second part of the same layer located in the light-shielding area. At least one of red, green, and blue color-filter layers is formed as a continuous layer on substantially all of the light-shielding layer.

8 Claims, 5 Drawing Sheets

COLOR LIQUID-CRYSTAL DISPLAY DEVICE

BACKGROUND OF THE INVENTION

1. Field of the Invention

The present invention relates to a color liquid-crystal display (LCD) device and more particularly, to a color LCD device improving the display quality.

2. Description of the Prior Art

The external-light reflection occurring on the display area is a common problem for every display device. This is because the external-light reflection remarkably degrades the contrast and chromaticity of an image on the display area and therefore, a viewer or user surely feels the display quality deterioration.

In a color LCD device, the external-light reflection tends to occur on the front (i.e., displaying side) surface of a color-filter substrate, a front polarizer attached onto the front surface of the color-filter substrate, and a black matrix formed on the back surface of the color-filter substrate. The reflectance is, for example, approximately 3% on the polarizer and approximately 40% on the black matrix formed by a metal layer.

To decrease the external-light reflection, in recent years, the front polarizer has been surface-roughened and/or the black matrix has been formed by a low-reflectance material in the conventional LCD devices.

Further, the following reflection-reduction technique has already been established. Specifically, to form the black matrix, a layer of a metal oxide such as chromium oxide and a layer of a metal such as chromium or nickel are formed to be stacked by evaporation processes, thereby forming a two-layer structure suppressing the mirror reflection of the external light utilizing the optical interference effect.

With the established reflection-reduction technique, however, the interference wavelength or color varies dependent upon the thickness of the layer of the metal oxide and accordingly, there is a problem that the chromaticity of the black matrix tends to deviate from its native black color. To solve this problem, a technique where a proper "black organic material" is used to form the black matrix has been developed. An example of the conventional color LCD devices using this technique is shown in FIGS. 1 and 2.

As seen from FIGS. 1 and 2, the conventional color LCD device includes an active-matrix substrate 110, and a color-filter substrate 120 disposed in parallel to and apart from the substrate 110. A space 150 is formed between the substrates 110 and 120.

A sealing material 140 is formed to surround the space 150, thereby sealing the space 150. A liquid-crystal material (not shown) is filled in the sealed space 150.

Spherical spacers 130 are disposed in the space 150 to keep the gap between the substrates 110 and 120 (i.e., cell gap) at a specific value. The spacers 130 are typically contacted with the two opposing surfaces of the substrates 110 and 120.

The active-matrix substrate 110 is formed by a transparent glass plate 111, transparent source lines 112 formed on the front (upper in FIG. 2) surface of the plate 111, and transparent pixel electrodes 113 formed on the front surface of the plate 111. Thin-Film Transistors (TFTs) (not shown) are formed on the front surface of the glass plate 111 to be arranged in a matrix array. The pixel electrodes 113 are arranged in a matrix array. The source lines 112 extend along the same direction perpendicular to the paper surface. The source lines 112 are electrically connected to the source regions of the corresponding TFTs, respectively.

The color-filter substrate 120 is formed by a transparent glass plate 121, a black matrix 122 formed on the back (lower in FIG. 2) surface of the plate 121, and Red- (R-), Green- (G-), and Blue- (B-) colored layers 123, 124, and 125 formed on the back surface of the plate 121. Each of these colored layers 123, 124, and 125 serves as a color filter. The black matrix 122 has linear windows arranged at regular intervals to expose the back surface of the glass plate 121. The R-, G-, and B-colored color-filter layers 123, 124, and 125, each of which has a linear plan shape, are disposed in the corresponding windows, thereby forming a stripe arrangement. The colored layers 123, 124, and 125 are opposite to the corresponding pixel electrodes 113, respectively. A common electrode (not shown) is formed to cover the black matrix 122 and the colored layers 123, 124, and 125.

A light-shielding layer 126 is formed on the back surface of the color-filter substrate 120 to surround the black matrix 122 and the stripe-arranged color filters 123, 124, and 125. The light-shield layer 126 is formed by the same material as that of the black matrix 122.

A screen (not shown) on which an image is displayed is disposed in the vicinity of the front surface of the color-filter substrate 120.

A sheet-like, transparent polarizer 160 is attached onto the back surface of the active-matrix substrate 110. A sheet-like, transparent polarizer 170 is attached onto the front surface of the color-filter substrate 120.

A planar back light 180 is located to be opposite to the back surface of the active-matrix substrate 110. The light 180 is apart from the polarizer 160.

The black matrix 122 is made of a black organic material, which is typically one of the photo-setting acrylic resins or one of the thermosetting polyimide resins. Therefore, there is an advantage that a native black color can be displayed on the screen unlike the conventional case where the black matrix is formed by a patterned metal layer. There is a further advantage that the mirror reflection of the external light is suppressed to thereby realize a high-grade display quality.

With the conventional LCD device in FIGS. 1 and 2, however, the following problems occur.

Specifically, since this device is of a transmission type, in other words, the image is displayed on the screen using the internal light emitted from the back light 180, the emitted light irradiates not only the display area including the color-filter layers 123, 124, and 125 and the black matrix 122 but also the light-shielding area including the light shielding layer 126.

Therefore, if the black matrix 122 does not have a sufficient light-shielding property, the irradiated light partially transmits or penetrates the black matrix 122. Thus, the contrast in the displayed image degrades in the display area and at the same time, some light leakage occurs in the light-shielding area, which deteriorates the display quality.

As a result, it is seen that the black matrix 122 needs to have two properties or capabilities of suppressing the external-light reflection and of shielding the internal light irradiated from the back light 180.

From this viewpoint, although the above-identified conventional LCD device shown in FIGS. 1 and 2 satisfies the former property of suppressing the external-light reflection, it does not satisfy the latter property of shielding the internal light. This is because a layer of black organic material (thickness: 0.1 μm has an Optical Density (OD) of 2 or less, and a layer of metal such as chromium and nickel (thickness: 0.1 μm) has a greater OD of 4. The OD value represents the light-shielding property.

To enhance the light-shielding property up to a satisfactory level, the layer of the black organic material needs to have a thickness of approximately 1 μm where the OD is approximately 3. However, such thickness increase of the black matrix 122 as above will cause another problem that the high-density and accurate patterning process of the black matrix 122 is very difficult to be realized. This means that the miniaturization of the pixels is difficult.

The light-shielding layer 126 may have a larger thickness than that of the black matrix 122. However, this will cause other problems that the necessary number of the fabrication processes increases to raise the fabrication cost and that an excessive cell-gap difference takes place between the display area and the light-shielding area to disturb the cell-gap control.

Other conventional light-shielding techniques are disclosed in the Japanese Non-examined Patent Publication Nos. 62-299889 published in December 1987 and 3-125120 published in May 1991.

In the technique disclosed in the Japanese Non-examined Patent Publication No. 62-299889, the periphery of the black matrix is expanded to the vicinity of the sealing material or to the dicing lines of the color-filter substrate. Since there is only the black matrix in the light-shielding area, the above-identified problem about the cell gap is not solved.

In the technique disclosed in the Japanese Non-examined Patent Publication No. 3-125120, the periphery of the color-filter layers and the black matrix (i.e., the periphery of the display area) is overlapped with the sealing material. Since the black matrix has an incomplete light-shielding property, the above-identified problem about the internal-light leakage is not solved.

Additionally, the LCD device disclosed in the Japanese Non-examined Patent Publication No. 3-125120 has the back light located on the side of the color-filter substrate, not the active-matrix substrate.

SUMMARY OF THE INVENTION

Accordingly, an object of the present invention is to provide a color LCD device capable of preventing the leakage of internal light irradiated from a back light without occurring the above-explained problems relating to the fabrication cost and the cell-gap control.

Another object of the present invention is to provide a color LCD device that is able to realize high-grade display quality.

The above objects together with others not specifically mentioned will become clear to those skilled in the art from the following description.

A color LCD device according to the present invention has a black matrix and a light-shielding layer, which are formed on a back surface of a color-filter substrate. The black matrix is located in a display area of the substrate. The light-shielding layer is located in a light-shielding area of the substrate. The black matrix is formed by a first part of a black layer located in the display area. The light-shielding layer is formed by a second part of the same layer located in the light-shielding area. At least one of R, G, and B color-filter layers is formed on the light-shielding layer.

With the LCD device according to the present invention, since at least one of the red, green, and blue color-filter layers is formed on the light-shielding layer in the light-shielding area, the optical transmittance in the light-shielding area is decreased. Therefore, the leakage of the internal light emitted from the back light can be prevented from occurring.

Also, the additional formation of the at least one of the red, green, and blue color-filter layers on the light-shielding layer solves the problem relating to the cell-gap control.

Further, the black matrix is formed by the first part of the black layer located in the display area, and the light-shielding layer is formed by the second part of the same layer located in the light-shielding area. Further, at least one of the red, green, and blue color-filter layers, which are necessarily formed in the display area, is formed on the light-shielding layer. Accordingly, the above-explained problem relating to the fabrication cost can be solved.

In a preferred embodiment of the present invention, at least two ones of the red, green, and blue color-filter layers are formed to be stacked on the light-shielding layer.

In this case, there is an additional advantage that the above-identified advantages of preventing the leakage of the internal light and solving the cell-gap control problem are enhanced.

In another preferred embodiment of the present invention, a protection layer is formed on the back surface of the color-filter substrate to cover the black matrix, the light-shielding layer, and the at least one of the red, green, and blue color-filter layers formed on the light-shielding layer.

In this case, there is an additional advantage that the above-identified advantages of preventing the leakage of the internal light and solving the cell-gap control problem are enhanced.

The protection layer is made of any one of acrylic resins or any one of polyimide resins.

It is preferred that the surface of the protection layer is planarized to reduce the height difference between the display area and the light-shielding area, because the cell-gap setting is realized more accurately.

The planarization may be realized by any mechanical or chemical polishing process.

In still another preferred embodiment of the present invention, the layer forming the black matrix is made of a black organic material.

In this case, there is an additional advantage that the external-light reflection is effectively suppressed.

As the black organic material, any one of photo-setting acrylic resins or any one of thermosetting polyimide resins may be used.

Each of the red, green, and blue color-filter layers may be formed by any one of acrylic resins or any one of polyimide resins, which contains one of red, green, and blue colors.

BRIEF DESCRIPTION OF THE DRAWINGS

In order that the invention may be readily carried into effect, it will now be described with reference to the accompanying drawings.

DETAILED DESCRIPTION OF THE PREFERRED EMBODIMENTS

Figure 1:
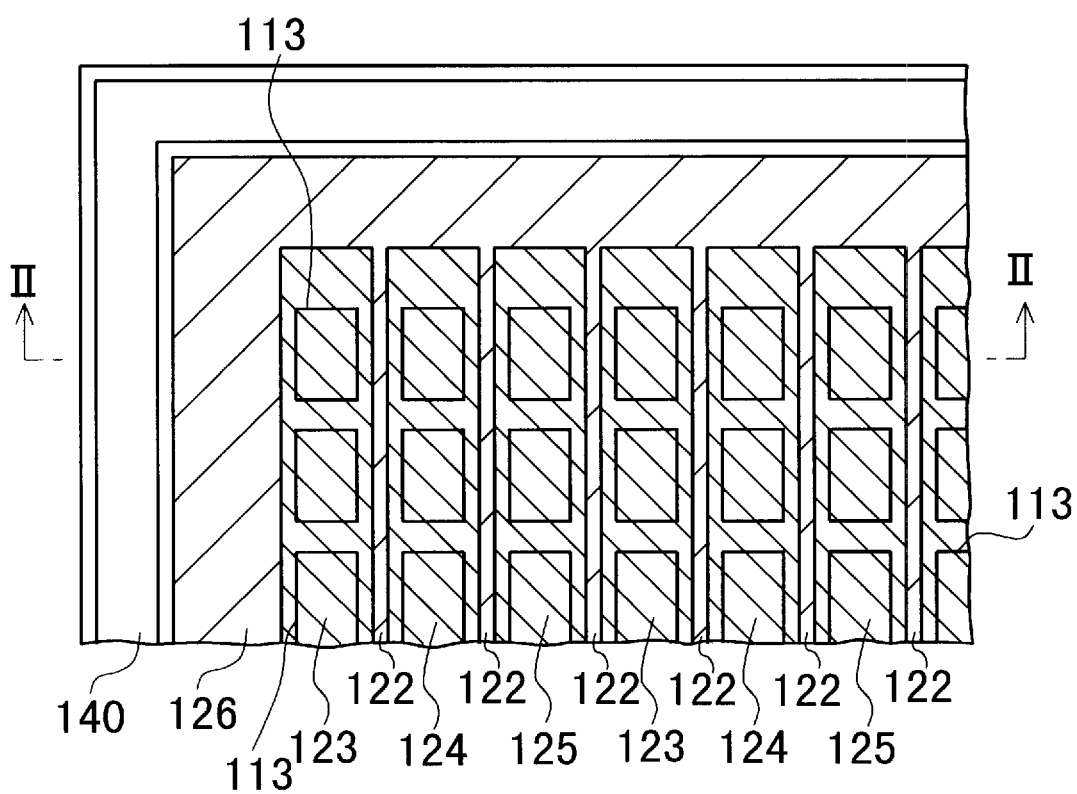
FIG. 1 is a schematic, partial plan view showing a conventional color LCD device.
Figure 2:
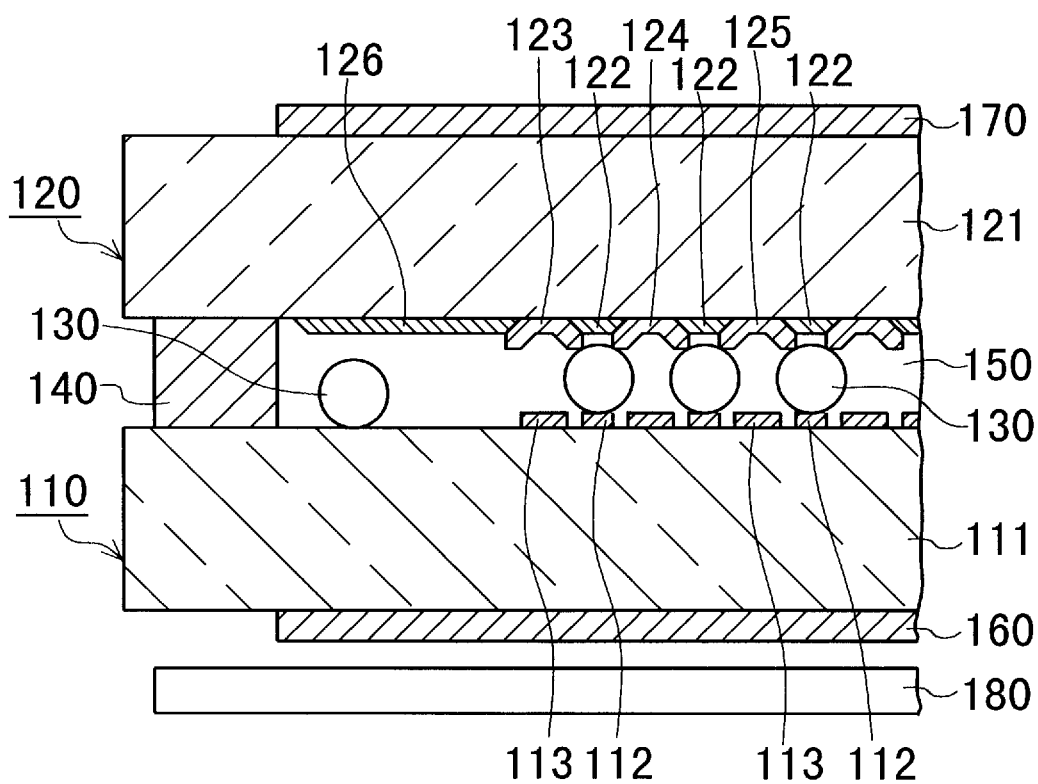
FIG. 2 is a cross-sectional view along the line II—II in FIG. 1.

Preferred embodiments of the present invention will be described below referring to the drawings attached.

FIRST EMBODIMENT

Figure 3:
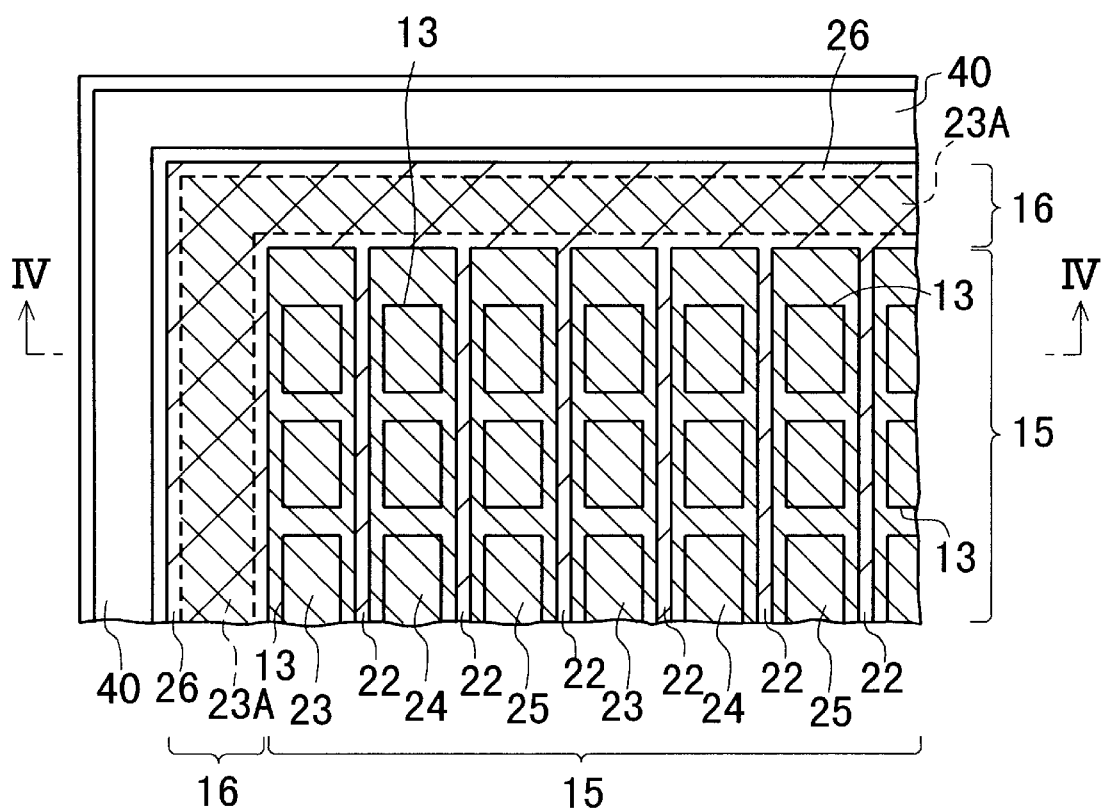
FIG. 3 is a schematic, partial plan view of a color LCD device according to a first embodiment of the present invention.
Figure 4:
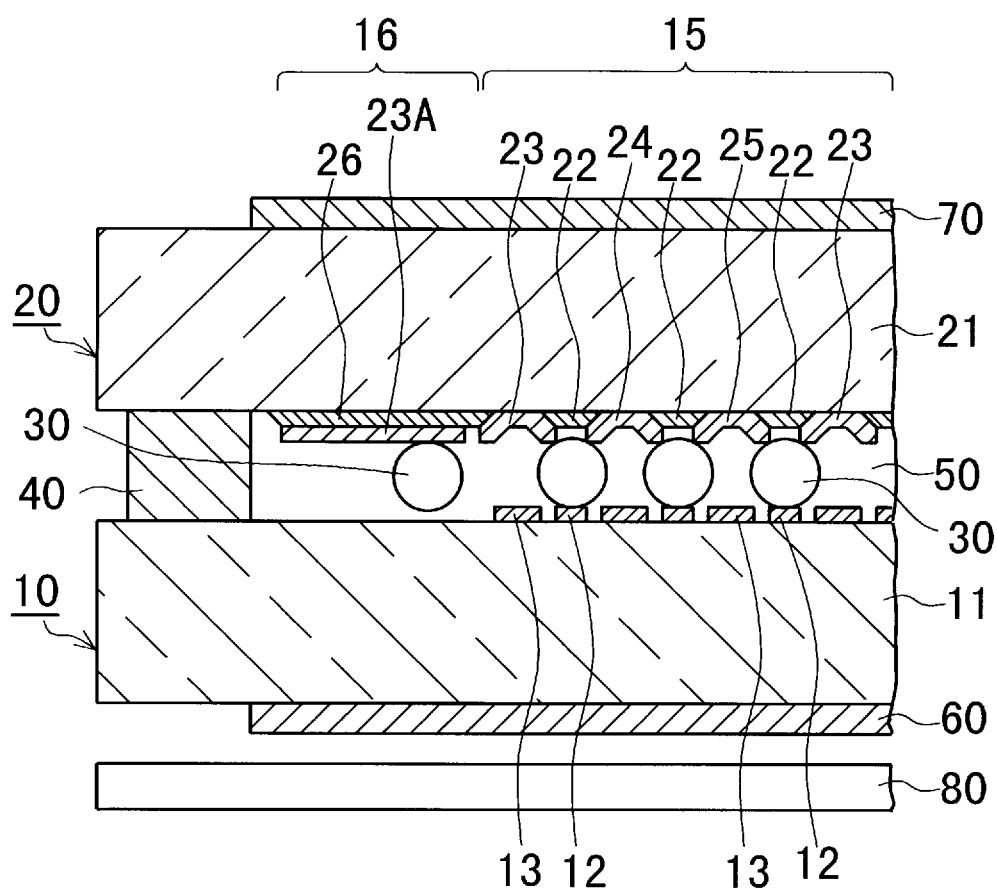
FIG. 4 is a cross-sectional view along the line IV—IV in FIG. 3.

As shown in FIGS. 3 and 4, a color LCD device according to a first embodiment of the present invention includes an active-matrix or TFT-array substrate 10, and a color-filter substrate 20 disposed in parallel to and apart from the substrate 10. A space 50 is formed between the substrates 10 and 20.

A sealing material 40 is formed to surround the space 50, thereby sealing the space 50. A liquid-crystal material (not shown) is filled in the space 50 sealed by the sealing material 40.

Spherical spacers 30 are disposed in the space 50 to keep the cell gap between the substrates 10 and 20 at a specific value. The spacers 30 are typically contacted with the two opposing surfaces of the substrates 10 and 20.

The active-matrix substrate 10 is formed by a transparent glass plate 11, transparent source lines 12 formed on the front (upper in FIG. 4) surface of the plate 11, and transparent pixel electrodes 13 formed on the front surface of the plate 11. TFTs (not shown) are formed on the front surface of the glass plate 11 to be arranged in a matrix array. The pixel electrodes 13 are arranged in a matrix array. The source lines 12 extend along the same direction perpendicular to the paper surface. The source lines 12 are electrically connected to the corresponding TFTs.

The color-filter substrate 20 is formed by a transparent glass plate 21, a black matrix 22 formed on the back (lower in FIG. 4) surface of the plate 21, and R-, G-, and B-colored layers 23, 24, and 25 formed on the back surface of the plate 21. Each of these colored layers 23, 24, and 25 serves as a color filter. The black matrix 22 has linear windows arranged at regular intervals to expose the back surface of the glass plate 21. The R-, G-, and B-colored color-filter layers 23, 24, and 25, each of which has a linear plan shape, are disposed in the corresponding windows, thereby forming a stripe arrangement. The colored layers 23, 24, and 25 are opposite to the corresponding pixel electrodes 13, respectively. A common electrode (not shown) is formed to cover the black matrix 22 and the colored layers 23, 24, and 25.

A light-shielding layer 26 is formed on the back surface of the color-filter substrate 20 to surround the black matrix 22 and the stripe-arranged color filters 23, 24, and 25. The light-shielding layer 26 is formed by the same material as that of the black matrix 22.

A screen (not shown) on which an image is displayed is disposed in the vicinity of the front surface of the color-filter substrate 20.

A sheet-like, transparent polarizer 60 is attached onto the back surface of the active-matrix substrate 10. A sheet-like, transparent polarizer 70 is attached onto the front surface of the color-filter substrate 20.

A planar back light 80 is located to be opposite to the back surface of the active-matrix substrate 10. The light 80 is apart from the polarizer 60.

The black matrix 22 is made of a black organic material, which is typically one of the photo-setting acrylic resins or one of the thermosetting polyimide resins. Therefore, there is an advantage that a native black color can be realized unlike the conventional case where the black matrix is formed by a patterned metal layer. There is a further advantage that the mirror reflection of the external light is suppressed to thereby realize a high-grade display quality.

An R-colored color-filter layer 23A is additionally formed on the light-shielding layer 26 in a light-shielding area 16, because the R-colored layer 23A has a comparatively low optical transmittance. The R-colored layer 23A may be replaced with a B-colored color-filter layer having approximately the same optical transmittance as that of the R-colored layer 23A.

The color-filter substrate 20 is fabricated by, for example, the following method.

First, a layer of a black organic material is formed on the inner or back surface of the color-filter substrate 20 by a popular film-formation process. Next, the layer is patterned by popular photolithography and etching processes to form the black matrix 22 in the display area 15 and the light-shielding layer 26 in the light-shielding area 16.

Further, the patterned R-, G-, and B-colored color-filter layers 23, 24, and 25 are successively formed on the back surface of the substrate 20 through the corresponding windows of the black matrix 22 by popular film-formation processes and popular patterning processes. During the step of forming the R-colored layer 23, the additional R-colored layer 23A is selectively formed on the light-shielding layer 26 in the light-shielding area 16. This is readily realized by suitably adjusting the pattern of a masking layer (not shown) for this step.

With the LCD device according to the first embodiment, since the light-shielding layer 26 is formed by a part of the same black organic layer as that of the black matrix 22, the external-light reflection can be suppressed due to the lowered reflectance.

On the other hand, the R-colored color-filter layer 23A is additionally formed on the light-shielding layer 26 to cover almost all of the layer 26 in the light-shielding area 16 and consequently, the optical transmittance in the light-shielding area 16 is decreased. Therefore, the internal light, which has been emitted from the back light 80 and has entered the space 50 through the polarizer 60 and the active-matrix substrate 10, can be prevented from leaking toward the front surface of the color-filter substrate 20 by the combination of the stacked color-filter layer 23A and the light-shielding layer 26.

Also, due to the additional formation of the color-filter layer 23A on the light-shielding layer 26, the height of the black matrix 22 and the R-, G-, and B-colored layers 23, 24, and 25 in the display area 15 from the back surface of the color-filter substrate 20 is approximately uniform in the display area 15 and the light-shielding area 16. This means that the cell gap is approximately uniform in these two areas 15 and 16; in other words, the previously explained problem relating to the cell-gap control can be solved.

Further, the black matrix 22 is formed by a part of the black layer located in the display area 15, and the light-shielding layer 26 is formed by another part of the same layer located in the light-shielding area 16. The R-colored layer 23A is necessarily for med in the display area 15. Accordingly, no additional process is necessary because of the addition of the layer 23A, which means that the above-explained problem relating to the fabrication cost can be solved.

SECOND EMBODIMENT

Figure 5:
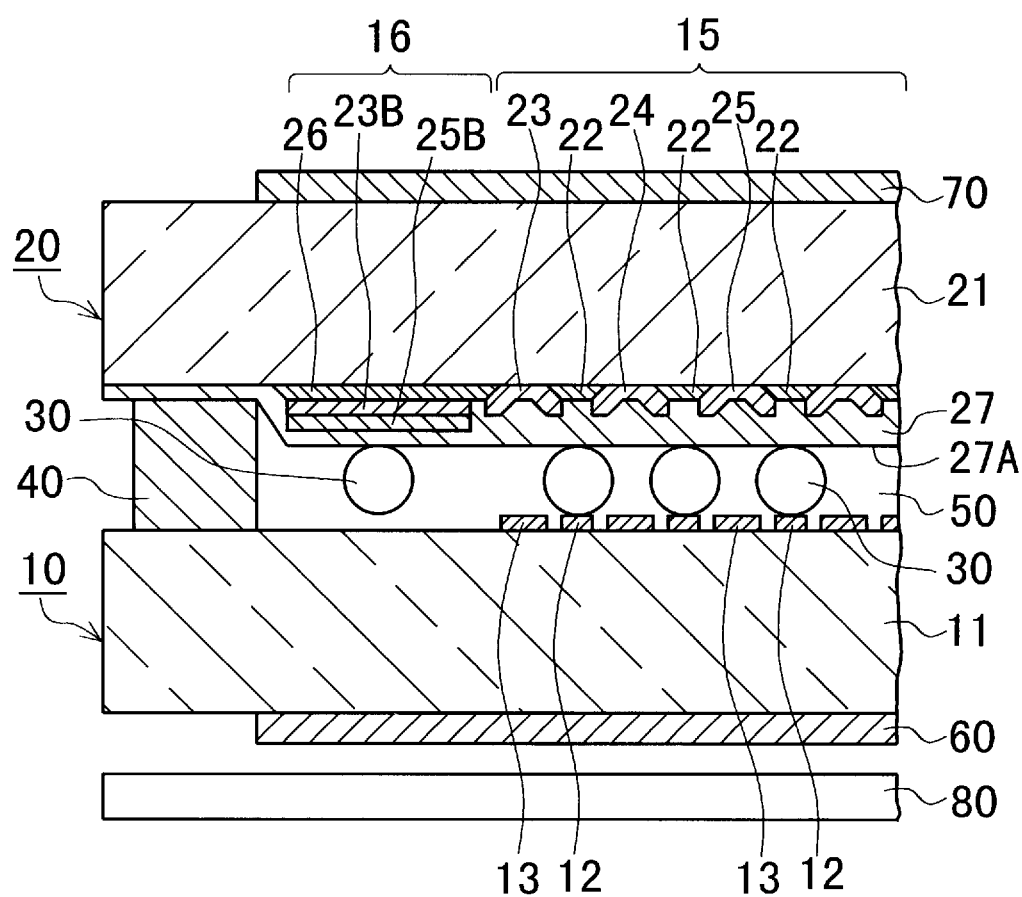
FIG. 5 is a cross-sectional view of a color LCD device according to a second embodiment of the present invention, which runs along the same line as that of the line IV—IV in FIG. 3.

FIG. 5 shows a color LCD device according to a second embodiment of the p resent invention. This device has the same configuration as that of the first embodiment except that the combination of a R-colored layer 23B and a B-colored layer 25B are formed on the light-shielding layer 26 in the light-shielding area 16 and that a protection layer 27 is formed to cover the black matrix 22, the R-, G-, and B-colored layers 23, 24, and 25 and the light-shielding layer 26.

Therefore, the description about the same configuration is omitted here by adding the same reference numerals as those in the first embodiment to the corresponding elements in FIG. 5 for the sake of simplification of description.

In the second embodiment, the protection layer 27, which is made of an acrylic resin or a polyimide resin, is surface-planarized by a known mechanical polishing process.

With the color LCD device according to the second embodiment, the R-colored layer 23B is formed on the light-shielding layer 26 and the B-colored layer 25B is formed on the R-colored layer 23B in the light-shielding area 16. As a result, the optical transmittance in the light-shielding layer 16 is lower than that in the first embodiment. This means that the leakage of the inner light from the back light 80 is prevented from occurring more effectively.

Also, due to the same reason, the height in the light-shielding area 16 from the back or inner surface of the color-filter substrate 20 is higher than the height in the display area 15, thereby increasing the cell gap in the light-shielding area 16. However, the surface-planarized protection layer 27 is provided on the whole back surface of the color-filter substrate 20 to cover both of the display and light-shielding areas 15 and 16 and as a result, the cell-gap difference in the both areas 15 and 16 is canceled. This contributes to the improvement in setting accuracy of the cell gap.

It is needless to say that the present invention is not limited to the above first and second embodiments. For example, all of the R-, G-, and B-colored color-filter layers 23, 24, and 25 may be formed to be stacked on the light-shielding layer 26 in the light-shielding area 16. In this case, to cancel the larger cell-gap difference, it is preferred that a same protection layer as that of the layer 27 in the second embodiment is formed and the surface of the protection layer is planarized.

While the preferred forms of the present invention has been described, it is to be understood that modifications will be apparent to those skilled in the art without departing from the spirit of the invention. The scope of the invention, therefore, is to be determined solely by the following claims.

What is claimed is:

1. A color LCD device comprising:

(a) a first substrate having a front surface and a back surface;

(b) pixel electrodes formed on the front surface of said first substrate;

(c) a second substrate having a front surface and a back surface;

said second substrate being coupled with said first substrate in such a way that the front surface of said second substrate is opposite to the back surface of said first substrate to be apart from said first substrate, thereby forming a space therebetween;

said space being sealed by a sealing material;

(d) spacers for keeping a gap between the front surface of said second substrate and the back surface of said first substrate at a specific value;

said spacers being located in said space;

(e) a black matrix formed on the back surface of said second substrate in a display area of said second substrate;

said black matrix being formed by a part of a black layer;

said black matrix having windows exposing the back surface of said second substrate;

(f) a patterned light-shielding layer formed on the back surface of said second substrate in a light-shielding area of said second substrate;

said light-shielding layer being formed by another part of said black layer;

(g) R-, G-, and B-colored filter layers selectively formed on the exposed back surface of said second substrate in said corresponding windows;

(h) a back light fixed on the side of the back surface of said first substrate;

said back light serves to emit inner light toward said space through said first substrate;

wherein at least one of said R-, G-, and B-colored color-filter layers also forms a continuous layer on substantially all of said light-shielding layer in the light-shielding area to surround the display area and to suppress the leakage of said inner light.

2. The device as claimed in claim 1, wherein at least two ones of said R-, G-, and B-colored filter layers are formed to be stacked on said light-shielding layer.

3. The device as claimed in claim 1, further comprising a protection layer formed on the back surface of said second substrate to cover said black matrix, said light-shielding layer, and said at least one of said R-, G-, and B-colored filter layers formed on said light-shielding layer.

4. The device as claimed in claim 3, the surface of said protection layer is planarized to reduce the height difference between said display area and said light-shielding area.

5. The device as claimed in claim 1, wherein said layer forming said black matrix is made of a black organic material.

6. The device as claimed in claim 1, wherein said continuous layer on said light-shielding layer is said R-colored layer.

7. The device as claimed in claim 6, further comprising said B-colored layer on said R-colored layer on said light-shielding layer, both said R- and B-colored layers covering substantially all of said light-shielding layer in the light-shielding area.

8. The device as claimed in claim 1, wherein said continuous layer on said light-shielding layer is said B-colored layer.

* * * * *